United States Patent
Bottomley et al.

(10) Patent No.: US 8,401,585 B2
(45) Date of Patent: Mar. 19, 2013

(54) METHOD AND APPARATUS FOR UPLINK POWER CONTROL IN A WIRELESS COMMUNICATION NETWORK

(75) Inventors: Gregory E. Bottomley, Cary, NC (US);
Yi-Pin Eric Wang, Cary, NC (US);
Stephen Grant, Cary, NC (US); Mikael Höök, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 867 days.

(21) Appl. No.: 12/553,333

(22) Filed: Sep. 3, 2009

(65) Prior Publication Data

US 2011/0053631 A1 Mar. 3, 2011

(51) Int. Cl.
*H04B 7/00* (2006.01)

(52) U.S. Cl. ............ 455/522; 455/15; 455/69; 455/450; 455/456.6; 455/509; 370/318; 370/329; 713/320

(58) Field of Classification Search .................. 455/522, 455/13.4, 15, 69, 434, 450, 455, 456.1, 456.6, 455/509, 515, 516; 370/318, 329, 348; 713/300, 713/320
See application file for complete search history.

(56) References Cited

U.S. PATENT DOCUMENTS

| | | | |
|---|---|---|---|
| 6,961,362 B2 * | 11/2005 | Ariyoshi et al. | 375/130 |
| 2003/0054850 A1 * | 3/2003 | Masseroni et al. | 455/522 |
| 2005/0232177 A1 * | 10/2005 | Herrmann | 370/315 |
| 2008/0200202 A1 * | 8/2008 | Montojo et al. | 455/522 |
| 2010/0303030 A1 * | 12/2010 | Andersson | 370/329 |

FOREIGN PATENT DOCUMENTS

WO WO 2009/068077 A1 6/2009

* cited by examiner

*Primary Examiner* — Shaima Q Aminzay

(57) ABSTRACT

A method and apparatus provide advantageous uplink power control for a set of uplink channels transmitted by a mobile terminal or other item of user equipment (UE). The proposed uplink power control maintains the total received power for the set of uplink channels at or about a target received power, while also maintaining the received signal quality for a subset of those channels—e.g., a particular one of them—at or about a target received signal quality. In an advantageous but non-limiting example embodiment, the subset comprises a fixed-rate control channel, and the set includes that control channel and a variable-rate traffic channel. Correspondingly, a base station generates first power control commands to maintain the received signal quality of the control channel at or about some quality target, and generates second power control commands to maintain the total received power (of the two channels) at or about some power target.

34 Claims, 12 Drawing Sheets

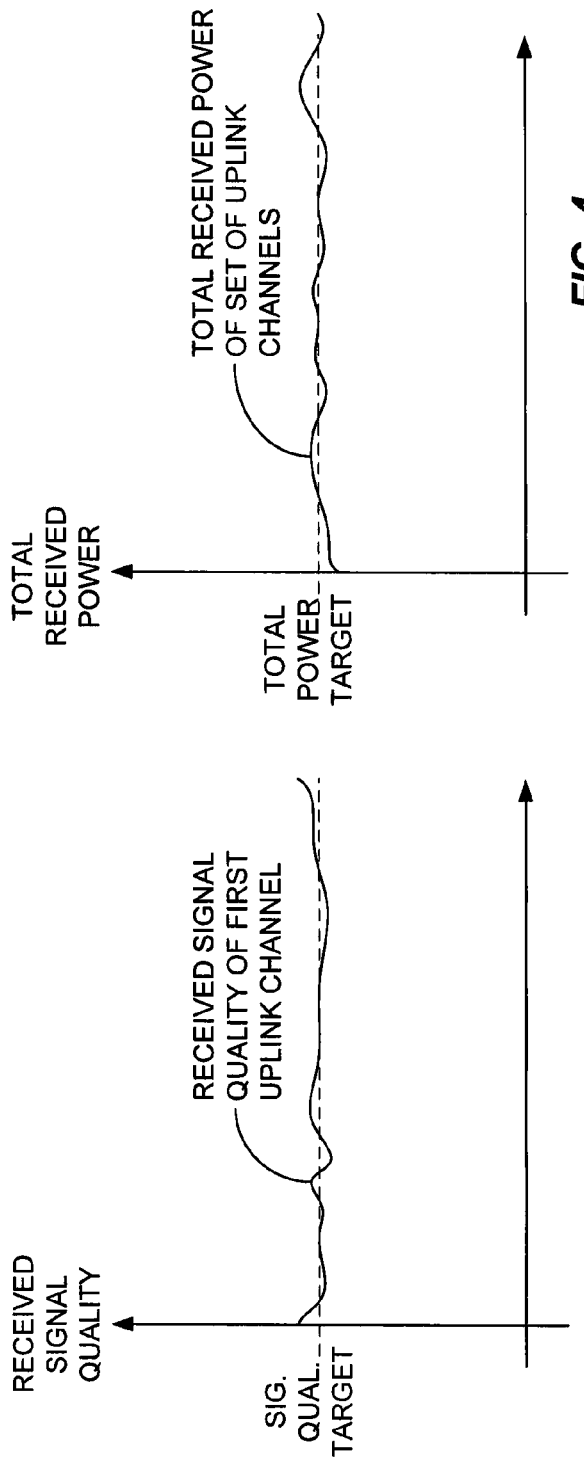

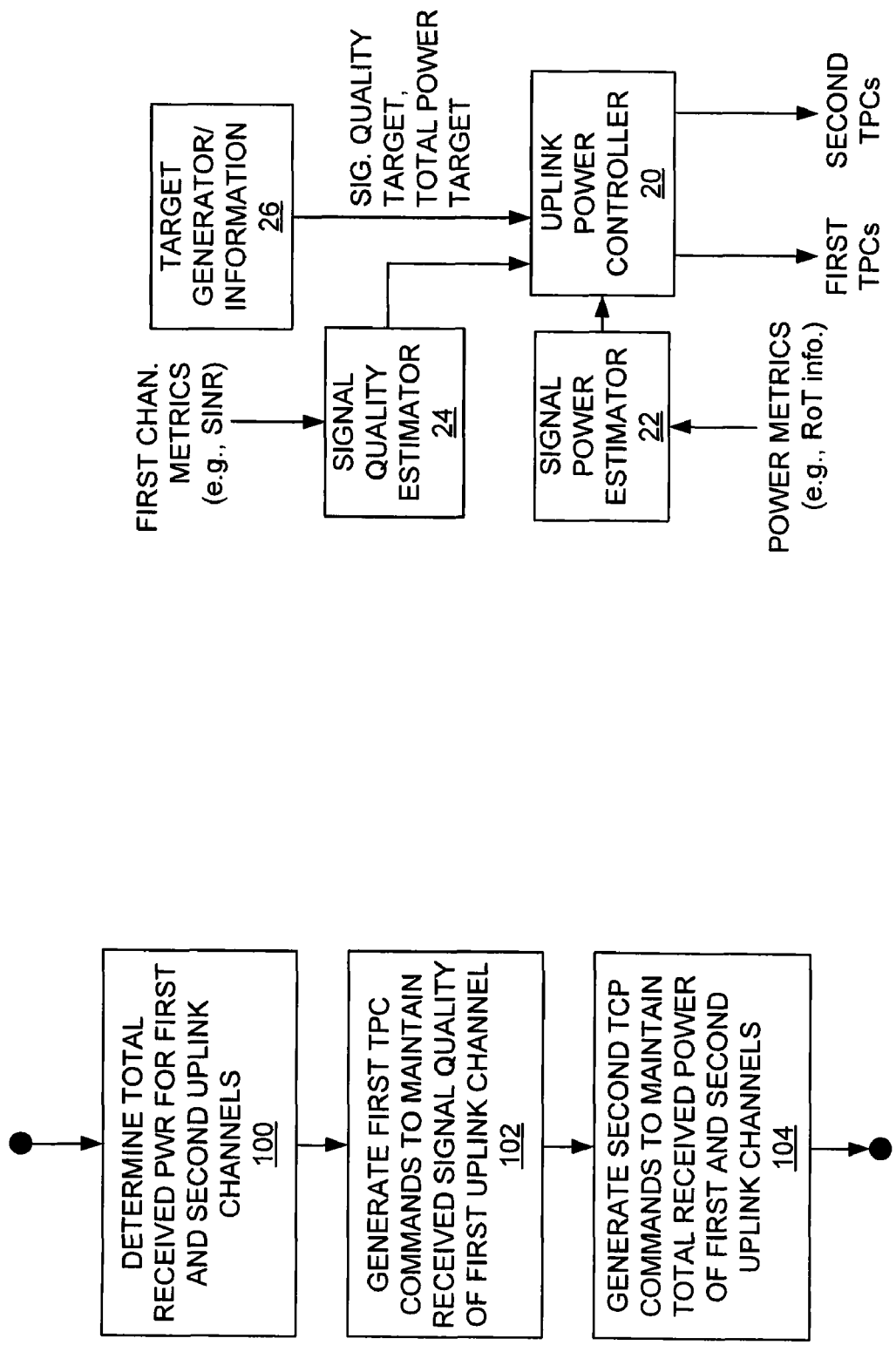

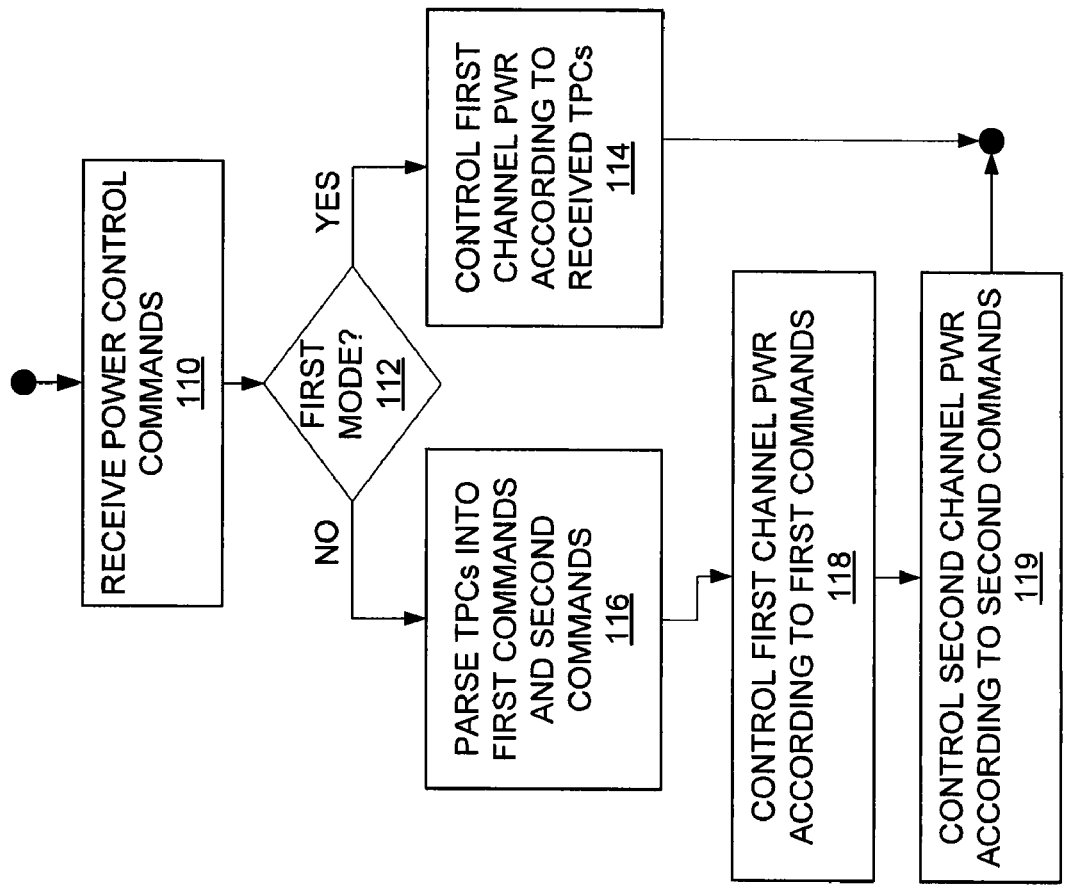

TOTAL PWR = 5:1
OVERHEAD = 1/3
SINR MET

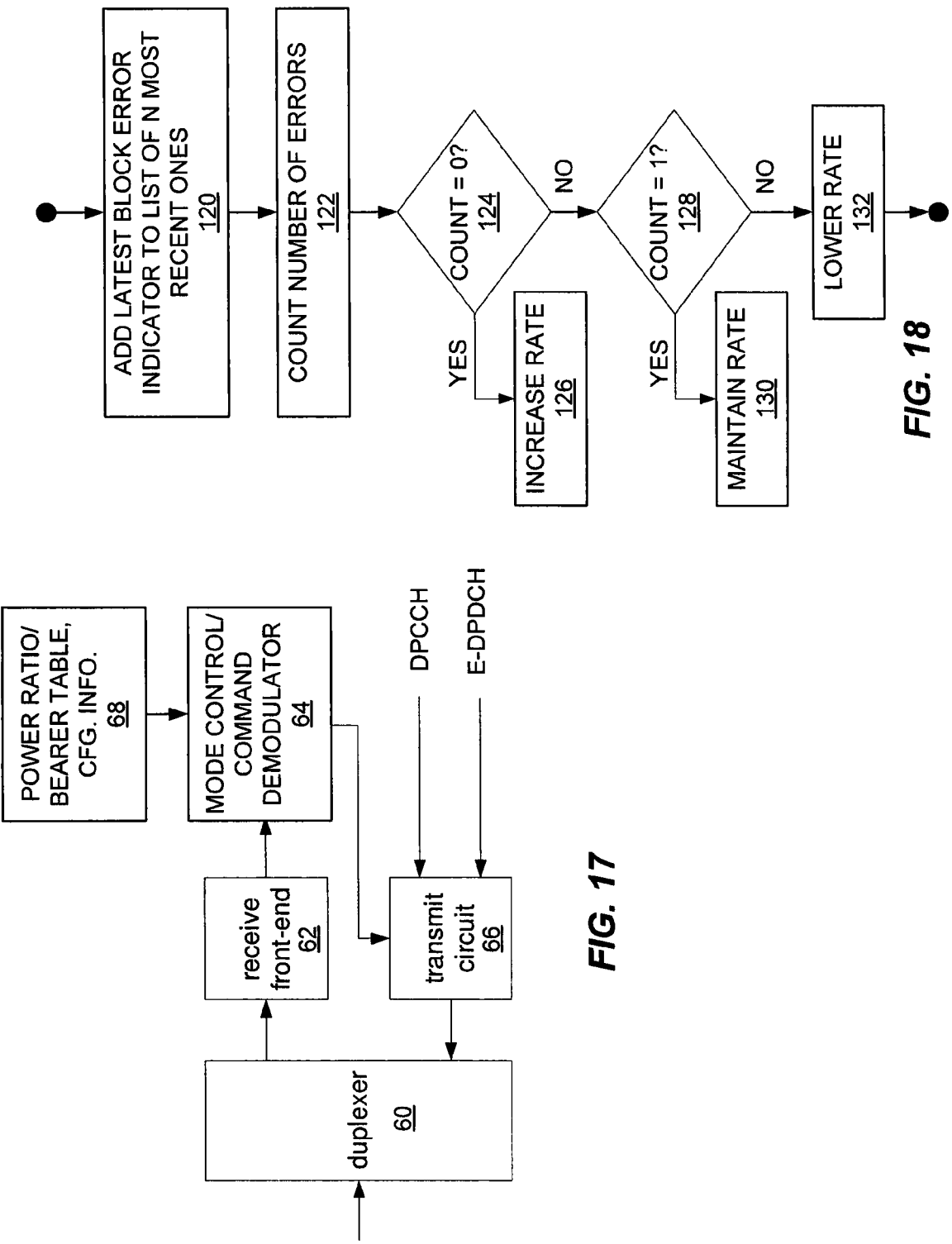

METHOD AND APPARATUS FOR UPLINK POWER CONTROL IN A WIRELESS COMMUNICATION NETWORK

TECHNICAL FIELD

The present invention generally relates to wireless communication networks, and particularly relates to transmit power control in such networks.

BACKGROUND

A common power control approach in interference-limited communication systems relies on a receiver feeding back transmit power control commands to a transmitter. The commands streaming back from the receiver tell the transmitter to incrementally increase or decrease its transmit power on an ongoing basis, as needed to maintain some reception metric for the transmitter's signal as received by the receiver. Received signal quality, expressed as a signal-to-noise ratio (SNR) or signal-to-interference-plus-noise ratio (SINR), is a common reception metric.

As with many aspects of wireless communication system operations, power control is becoming increasingly complicated with increasing data rates. For example, Wideband Code Division Multiple Access (WCDMA) was originally developed for circuit voice and moderate data rates, employing long (10 ms) Transmission Time Intervals (TTIs). Uplink transmissions always include the Dedicated Physical Control Channel (DPCCH)—which is a fixed-rate control channel—thereby providing a reference for SINR-based closed-loop power control. When the UE has traffic data to send, the NodeB (a WCDMA base station) grants the UE a transmit power allocation on the Enhanced Dedicated Physical Data Channel (E-DPDCH) that is relative to the DPCCH power.

Doing so is synonymous with granting a data rate to the UE for its uplink transmission, as there is a fixed table relating relative power and data rate sent to the UE at set-up. As data is transmitted, outer-loop power control is employed, with the NodeB raising or lowering the target SINR value for receiving the E-DPDCH from the UE, depending on whether block errors occur. The NodeB carries on such power control to maintain a target block-error-rate (BLER) for the traffic data incoming from the UE.

The above-described approach to uplink power control rests on a number of assumptions that were true when WCDMA systems were first deployed. First, the SINR-based closed-loop power control approach assumes that SINR can change within a TTI, which is true when the TTI is long (10 ms) relative to the fading rate. Second, such a closed-loop power control assumes that the NodeB has enough excess resources (received power headroom) to allow a UE to use more resources (increase its received power). Third, the data rate selection based on a fixed relation between power and rate assumes that self-interference is not significant. This third assumption holds true at moderate data rates.

However, the WCDMA uplink has evolved to a point where these assumptions no longer hold. As for the first assumption, a shorter TTI (2 ms) has been introduced so that signal quality is approximately constant over a TTI. As for the second and third assumptions, data rates have become high enough that self-interference is significant, even after equalization. As a result, SINR does not simply scale with signal power S, but also depends on a fading-realization-dependant orthogonality factor. Consequently, there is a channel-dependent relation between power and supportable rate, and instability can result when the target SINR value is above the SINR ceiling.

Known approaches to one or more of the above problems include adapting closed-loop power control based on a measure of S/(I+N) instead of S/(self I+I+N)—see, e.g., WO 2008/057018 (published on 15 May 2008). As noted, S is signal power (received), and I is co-channel interference from own-cell and other-cell signals, N is thermal noise, and "self I" is the self interference due to dispersive channels. This approach reduces instability at the expense of performance (block error rate increases). As a result, more retransmissions occur, thus increasing delay (latency).

In another alternative, a series of power commands are inhibited to improve stability—see, e.g., U.S. utility patent application Ser. No. 12/022,346, filed on 30 Jan. 2008. As with the above-noted power control adaptation, this approach can degrade performance, thus causing more retransmissions. Yet another alternative introduces a second outer-loop power control loop, so that quality (SINR) of traffic and control data can be just met, rather than one being exceeded. While this approach improves efficiency, it does not address the instability caused when SINR requirements cannot be met.

In another alternative, the power of the traffic relative to the control (traffic gain or beta factor) is adapted to maintain quality (SINR) on the control channel in addition to the SINR of the traffic channel. This is done either at the network side (based on measured quality of the control channel) or the UE side (based on ACK/NACK feedback from the NodeB). This technique, by itself, does not solve the power instability problem, as self interference can cause SINR targets not to be met.

SUMMARY

According to the teachings herein, a method and apparatus provide advantageous uplink power control for a set of uplink channels transmitted by a mobile terminal or other item of user equipment (UE). The proposed uplink power control maintains the total received power for the set of uplink channels at or about a target received power, while also maintaining the received signal quality for a subset of those channels—e.g., a particular one of them—at or about a target received signal quality.

In an advantageous but non-limiting example embodiment, the subset comprises a fixed-rate control channel, and the set includes that control channel and a variable-rate traffic channel. Correspondingly, a base station generates first power control commands to maintain the received signal quality of the control channel at or about some quality target, and generates second power control commands to maintain the total received power (of the two channels) at or about some power target. In at least one such embodiment, the data rate of the traffic channel is adapted as needed. For example, the data rate on the traffic channel can be adjusted downward (upward) as the transmit power of the control channel is raised (lowered). Additionally, or alternatively, the total received power target can be temporarily raised (or violated), to allow for increasing or maintaining a given data rate on the traffic channel, while maintaining the requisite received signal quality for the control channel.

For Wideband Code Division Multiple Access (WCDMA), the teachings herein provide one or more embodiments directed to a Dedicated Physical Control Channel (DPCCH) and an Enhanced Dedicated Physical Data Channel (E-DPDCH), as being in the set of uplink channels subject to the proposed uplink power control. One aspect of the proposal is to add a new power control loop to maintain the total received power allocated to an uplink user (S or SNR). However, because SINR (quality) is not maintained for the traffic data (E-DPDCH, variable-rate service, one portion of the overall signal), the UE must adapt the rate of traffic data as SINR changes. The original DPCCH power control loop is still used to maintain quality (SINR) for fixed-rate (control or overhead, another portion of the overall signal) services. Alternatively, the original power control loop can be replaced by a loop that adapts the fraction of power allocated to the DPCCH.

A further aspect is how rate is set at the time of grant. At the time of grant, the user is usually granted a power, relative to the current DPCCH level. There is a table that gives a one-to-one relation between granted power and rate. It is assumed the new DPCCH level is the same as the old one. The teachings herein propose decoupling these in one or more embodiments, so that the rate and new DPCCH level are signaled separately.

Another aspect is how rate is adapted when the grant is being used. Conventionally, the rate is kept the same and both inner and outer power control loops are used to maintain quality. Breaking from that convention, uplink power control as proposed herein maintains the total received power, and adapts the (traffic) rate as received signal quality changes for the traffic channel. Correspondingly, one or more embodiments of the proposed uplink power control uses an intelligent "walk" algorithm that lowers, maintains, or raises the rate depending on block errors, as well as commands from the new power control loop.

BRIEF DESCRIPTION OF THE DRAWINGS

FIG. 2 is a diagram of an example set of uplink channels, for which the disclosed uplink power control method may be used.

FIG. 3 is an example plot of power control applied to a first uplink channel to maintain received signal quality of that first uplink channel, while FIG. 4 is an example plot of power control applied to a set of uplink channels, including the first uplink channel, to maintain a total received power of the set.

FIG. 5 is a logic flow diagram illustrating one embodiment of a method of uplink power control, as taught herein.

FIG. 6 is a block diagram illustrating one embodiment of base station processing circuits, configured to implement two power control loops that in combination control the received signal quality of one or more uplink channels, while controlling the total received power of a set of uplink channels that includes those one or more uplink channels.

FIG. 10 is a diagram of a Transmit Power Control (TPC) command word that may include first and second TPCs, corresponding to first and second power control loops at a base station.

FIG. 11 is a logic flow diagram of one embodiment of modal processing at a mobile terminal, wherein the mobile terminal parses and responds to received power control commands differently, in dependence on whether it is operating in a first or second mode.

FIG. 17 is block diagram of one embodiment of mobile terminal processing circuits configured to respond to a base station's uplink power control commands.

FIGS. 18 and 19 are logic flow diagrams illustrating example approaches to (traffic) channel rate adaptation.

DETAILED DESCRIPTION OF SEVERAL EMBODIMENTS

Figure 1:
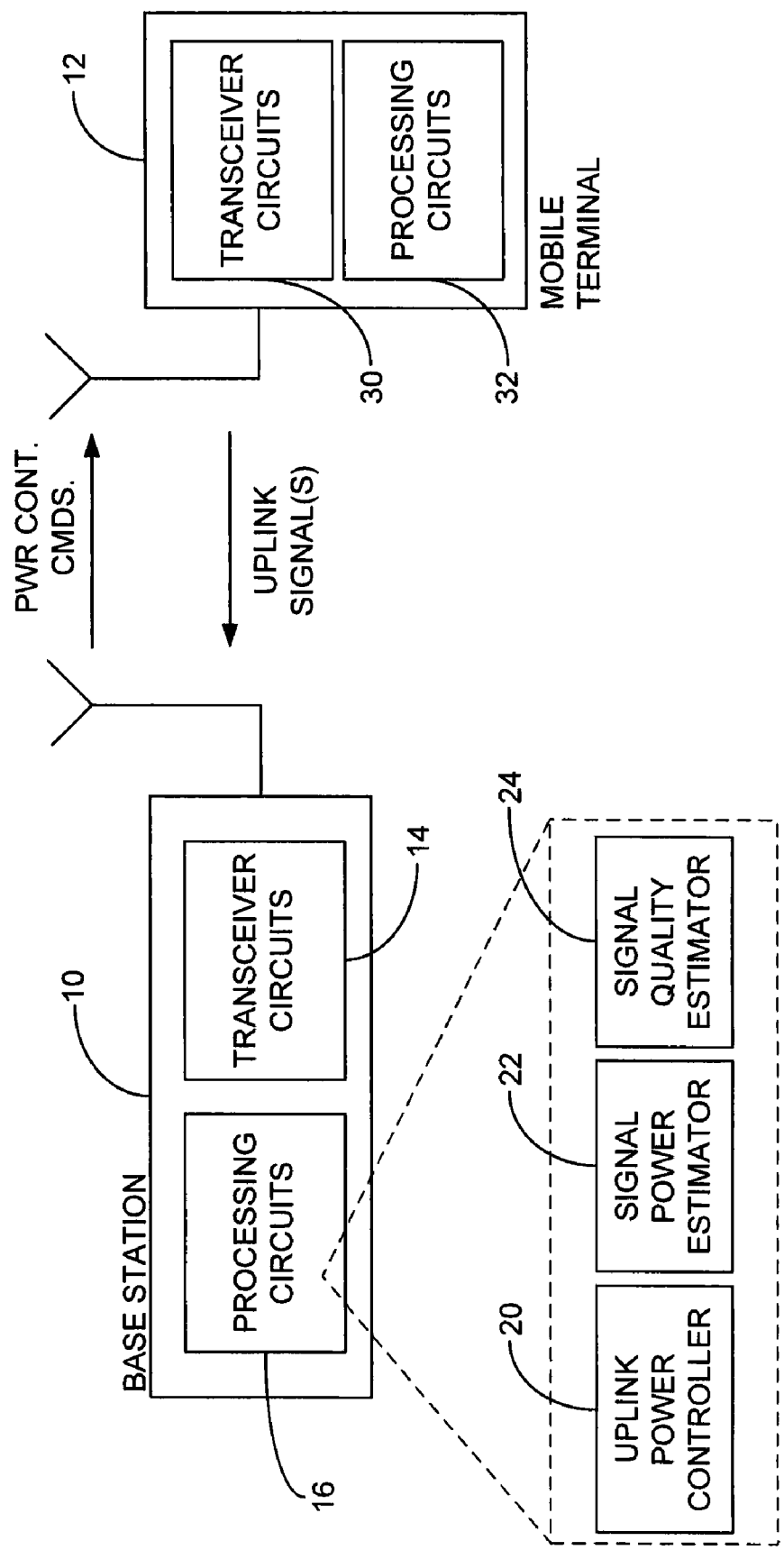
FIG. 1 is a block diagram of one embodiment of a base station in a wireless communication network, and an associated mobile terminal.

FIG. 1 illustrates a base station 10 that is configured for use in a wireless communication network. For example, in one or more embodiments, the base station 10 comprises a NodeB in a Wideband Code Division Multiple Access (WCDMA) network. The base station 10 is configured to provide uplink power control for mobile terminals 12. Only one mobile terminal 12 is illustrated, but those skilled in the art will appreciate that the base station 10 can support a large plurality of mobile terminals 12, including the inventive uplink power control proposed herein.

Transceiver circuits 14 included in the illustrated base station 10 allow it to receive uplink signals from mobile terminals 12 and to transmit downlink signals to mobile terminals 12. The base station 10 further includes one or more processing circuits 16 that are operatively associated with the transceiver circuits 14, and are configured to generate first power control commands for a mobile terminal 12, calculated to maintain a received signal quality for a first uplink channel transmitted by the mobile terminal 12 at a received signal quality target. Further, the processing circuits 16 are configured to generate second power control commands for the mobile terminal 12, calculated to maintain a total received power for a set of uplink channels transmitted by the mobile terminal 12 at a total received power target, and to transmit the first and second power control commands to the mobile terminal.

As shown in FIG. 2, the set of uplink channels includes the first uplink channel and at least a second uplink channel, although in some embodiments, the set includes more than just the first and second uplink channels. Correspondingly, FIGS. 3 and 4 present example plots of ongoing transmit power control for the first uplink channel and the set of uplink channels, respectively, as driven by the first and second power control commands generated by the base station 10 in accordance with the above processing. While these plots are not presented in any particular scale, and are not necessarily meant to depict literal waveforms, they do show the base station's concurrent two-loop control of received signal quality for the first uplink channel and the overall (total) received power of the set of uplink channels. The coordinated control thus preserves received signal quality for the first uplink channel (or for some subset of uplink channels), while maintaining total received power for the overall set of uplink channels.

FIG. 5 illustrates base station processing implementing one embodiment of the above-described uplink power control. The illustrated method includes determining total received power for first and second uplink channels transmitted by a mobile terminal 12 (Block 100). Further, the method includes generating first transmit power control (TPC) commands, to maintain the received signal quality of the first uplink channel, at or about a received signal quality target (Block 102). By way of example, the received signal quality target may be a predefined or dynamically configured SINR value in dB against which the measured SINR of the first uplink channel, as received at the base station, is compared.

The method further includes generating second TPC commands, to maintain the total received power of the first and second uplink channels (Block 104). In one embodiment, for example, the base station 10 is configured to measure Rise-over-Thermal (RoT) or UE signal-to-noise ratio (SNR) or UE signal power (S), which indicates the extent to which UE's received signal power at the base station 10 is above the thermal noise of its receiver circuitry.

FIG. 6 illustrates one embodiment of processing circuits in the base station 10 that are configured to generate power control commands corresponding to the above-described modal operation. In the illustration, an uplink power controller 20 includes a signal power estimator 22, and a signal quality estimator 24, along with a target generator/information circuit 26.

In operation, the target generator/information circuit 26 provides the uplink power controller 20 with signal quality and total received power targets. Correspondingly, the signal power estimator 22 provides the uplink power controller 20 with a (current or most recent) estimate of the total received power for the set of uplink channels of interest. Similarly, the signal quality estimator 24 provides the uplink power controller 20 with a (current or most recent) estimate of the received signal quality for a particular one or subset of uplink channels in the set.

The uplink power controller 20 compares the received signal quality target with estimated signal quality, and the total received power target with estimated total received power, and correspondingly generates first and second TPCs. In combination, these TPCs maintain the total received power of a set of uplink channels transmitted by a given mobile terminal 12 at or about a defined total received power target, while also maintaining a first uplink channel (or a subset of uplink channels) in the set at or about a defined received signal quality target.

Such control is advantageous not least because, in the uplink, the received power level at the base station 10 is a "shared" resource with respect to the plurality of mobile terminals 12 being supported by the base station 10. That is, there is an aggregate maximum received power from all received signals that the base station 10 can handle. This limit is commonly expressed in terms of RoT. Typical values are 6 or 7 dB, and, while interference cancellation at the base station 10 may allow for higher values, there will still be a limit due to other-cell interference that is not canceled. On the other hand, the uplink transmit power needed by each mobile terminal 12 for effective transmission generally increases with increasing data rates. Thus, a given plurality of mobile terminals 12 are competing in some sense for greater individual allocations of the base station's total received power margin.

Consequently, resource allocation should be done in terms of received signal power S or S/N (as noise N due to thermal noise is fixed). If the S/N ratio (SNR) is maintained instead of variable-rate traffic SINR for each mobile terminal 12 or at least for those mobile terminals 12 operating at high data rates, then instability will be prevented. Also, tighter control over resource allocation will be achieved. Note that total power S for the set of uplink channels in this sense is either relative to a fixed power level (e.g. 1 Watt) or relative to a slowly varying power level such as thermal noise (SNR).

When SNR is fixed, signal quality or SINR varies. SINR can be expressed as $$SINR = \frac{\rho S}{aS + I + N}, \quad \text{(Eq. 1)}$$

where S is signal power, I is co-channel interference from own-cell and other-cell signals, N is thermal noise and $\alpha S$ is self-interference, and where a is the instantaneous (channel-dependent) non-orthogonality factor (OF) that varies between 0 (perfect orthogonality) and 1. (For example $\alpha$ is 0 in flat channels, and non-zero in dispersive channels.) Also, $\rho$ is the fraction of total power S allocated to a particular channel.

With the above in mind, those skilled in the art will appreciate that one or more embodiments of the uplink power control proposed herein provide advantageous power control for a set of uplink channels that includes a fixed-rate channel, e.g., a control/overhead channel, and a variable-rate channel, e.g., a traffic channel. The consequence of maintaining the total received power for the set of uplink channels is, of course, the fact that the transmit power allocated to any one or more of the uplink channels in the set may be adjusted downward, as needed, to avoid excessive total received power for the set at the base station 10.

Power variations made to maintain the overall received power at the base station 10 can be compensated for on variable-rate channels in the set by making corresponding adjustments in their data rates, but that approach does not work for fixed rate channels in the set. To preserve SINR or other quality-related reception requirements on fixed-rate channels, the teachings herein propose SINR-based power control for such channels. As the total received power, denoted as S, for the set of uplink channels is fixed, the proposed approach involves dynamic adaptation of the power split (of the total) between two or more of the uplink channels in the set.

Figure 7:
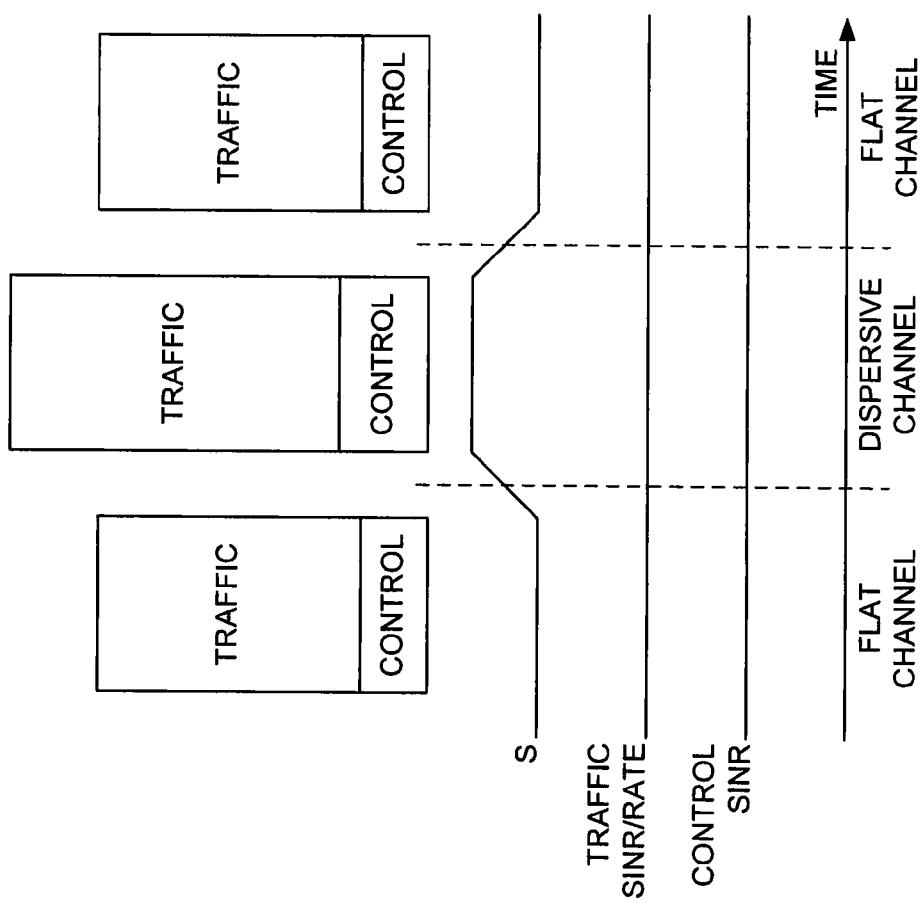
FIG. 7 is a plot illustrating the effects of a known approach to uplink power control, where the total power allocation S for a control and traffic channel is changed, as needed, to maintain SINR on both channels.

For discussion, a fixed rate control channel and a variable-rate traffic channel are used as examples of first and second uplink channels comprising a set of uplink channels transmitted by a mobile terminal 12 to the base station 10. FIG. 7 illustrates a conventional, known approach to power control. One sees that the overall received power S of the control and traffic channel signals increases, as the power of the traffic channel and the fixed rate control channel is increased, such as to compensate for dispersive (versus flat) propagation channel conditions.

Figure 8:
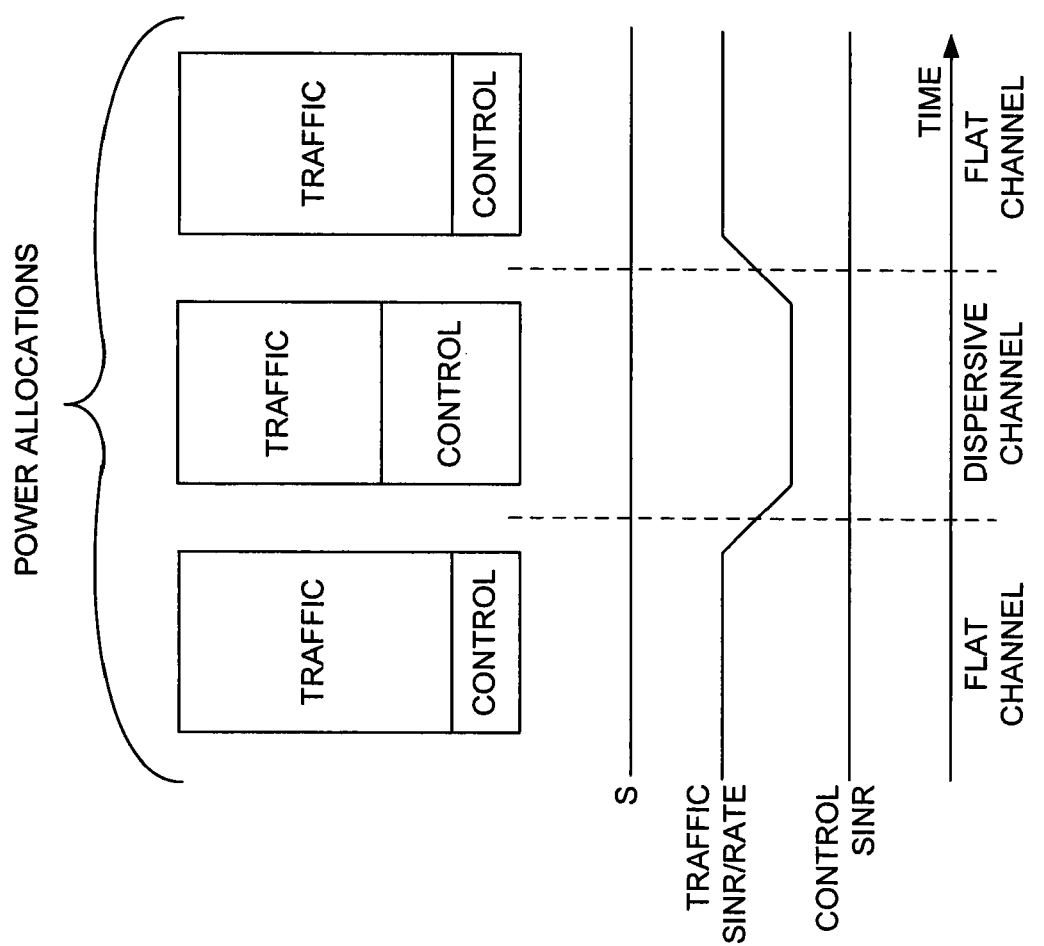
FIG. 8 is a plot contrasting with FIG. 7, and showing the effects of one embodiment of a proposed method of uplink power control, for the same traffic and control channels as depicted in FIG. 7.

In contrast, FIG. 8 illustrates the effects of uplink power control for the same two channels, using an embodiment of uplink power control as proposed herein. One sees that, under the contemplated uplink power control, the total power S does not change as channel conditions change from flat to dispersive (or back again). Rather, the power split between the traffic and control channels changes as the propagation channel goes from flat to dispersive.

Particularly, the allocation of power for transmitting the control channel is increased, so as to maintain the received signal quality of that channel at the base station. Correspondingly, the allocation of power for transmitting the traffic channel is decreased and a concomitant decrease in transmit data rate is carried out, to compensate for the lower allocation of power to the traffic channel. While such a decrease is desirable, it is possible to omit this step and allow hybrid ARQ to address the packet errors that would occur.

At some time instants, the total power target used by the base station 10 may be too low to maintain the required received signal quality on the control channel, even if the traffic channel rate is reduced to zero and the control channel takes all of total power allocation. Therefore, according to one or more embodiments of uplink power control, the total received power target is temporarily ignored (or raised) by the base station 10, as needed, to allow the transmit power used for the control channel to be increased, to maintain the target received signal quality at the base station 10. Such operations are shown in FIG. 9.

Figure 9:
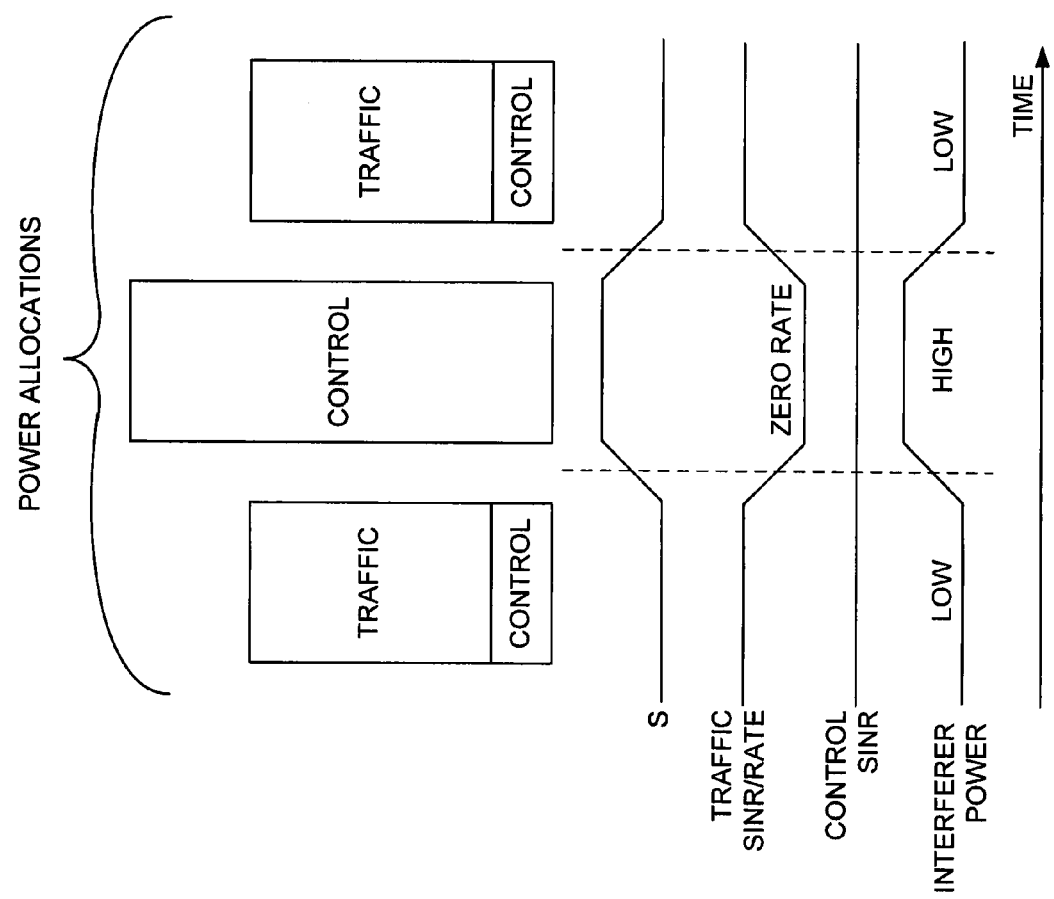
FIG. 9 is a plot showing the effects of yet another embodiment of a proposed method of uplink power control, as regards the traffic and control channels at issue in FIGS. 7 and 8.

In a WCDMA embodiment, where the total received power limit is applied to a DPCCH and an E-DPDCH being transmitted on the uplink by a given mobile terminal 12, the processing corresponding to the power control/allocation shown in FIG. 9 can be understood to mean that the E-DPDCH rate is dropped to zero, and the total received power target is ignored or temporarily raised, with all of that raised power allocation going to the DPCCH, to maintain the received signal quality of the DPCCH at the base station 10.

For achieving this advantageous uplink power control, whether cast in terms of WCDMA-based channels, such as above, or more generally, in terms of first and second channels, the base station 10 includes appropriately configured processing circuits. Referring back to FIG. 1, the processing circuits 16 of the illustrated base station 10 include an uplink power controller 20, a signal power estimator 22, and a signal quality estimator 24. These processing circuits 16 can be understood as generating power control commands for the mobile terminal 12 according to the teachings presented herein. Correspondingly, the mobile terminal 12 includes a transceiver circuit 30 for receiving those transmitted power control commands, and associated processing circuits 32 for controlling the uplink transmit power of the transceiver circuits 30 in accordance with those received commands.

Those skilled in the art will appreciate that the processing circuits 16 and 32 of the base station 10 and the mobile terminal 12, respectively, may be implemented in hardware, in software, or in some combination of hardware and software. For example, dedicated digital signal processing hardware may be used for certain aspects of transmit and/or receive signal processing or control, while software-based processing is used for other aspects. In either case, the base station 10 constitutes a particular machine that is configured by hardware, software, or a mix thereof, to perform the uplink power control method(s) proposed herein. Likewise, the mobile terminal 12 constitutes a particular machine that is configured to operate under and in cooperation with the proposed uplink power control method.

In at least one embodiment, the base station's processing circuits 16 include at least one microprocessor-based circuit (including any needed program/data memory), that is configured at least in part by the execution of stored program instructions to carry out the proposed uplink power control method. To that end, the processing circuits 16 include or are associated with a computer readable medium included in the base station 10, which is configured to store one or more computer programs. Similar microprocessor-based implementations may be used in the mobile terminal 12, for mobile-side processing.

Regardless of the particular implementation details, the base station 10 is configured to generate first power control commands for the mobile terminal 12, which are calculated to maintain a received signal quality—e.g., SINR—for a first uplink channel transmitted by the mobile terminal 12 at a received signal quality target. The base station is further configured to generate second power control commands for the mobile terminal 12, which are calculated to maintain a total received power for a set of uplink channels transmitted by the mobile terminal at a total received power target.

As noted, the set of uplink channels includes at least the first uplink channel and a second uplink channel transmitted by the mobile terminal 12. (Here, the first and second uplink channels may be understood as different physical layer channel transmissions by the mobile terminal 12.) Also, as noted, the base station 12 uses a defined (static or dynamic) signal quality target for evaluating the signal quality of the first uplink channel, and uses a defined (static or dynamic) total received power target for evaluating the combined received power of the first and second uplink channels (in combination with any further channels in the set).

In one or more embodiments, the first uplink channel is a control channel and the second uplink channel is a traffic channel. The traffic channel is selectively granted to the mobile terminal 12 by the base station 10, and, as part of granting the traffic channel to the mobile terminal 12, the base station 10 is configured to indicate to the mobile terminal 12 a particular radio bearer to use for transmitting on the traffic channel and indicate to the mobile terminal 12 an initial allocation of transmit power for the traffic channel relative to transmit power of the control channel.

In at least one such embodiment, the mobile terminal 12 maintains a table or formula relating different ratios of traffic-to-control channel transmit power to different radio bearers supporting different transmit rates. Correspondingly, the base station 10 is configured to indicate the particular radio bearer to be used by the mobile terminal 12, by signaling a table index or formula parameter. Also, the base station 10 is, in at least one embodiment, configured to determine the particular radio bearer by predicting a received signal quality at the base station 10 for the traffic channel as a function of power allocation and estimated self-interference associated with the traffic channel.

In conjunction with the base station's uplink power control, the mobile terminal 12 transmits the set of uplink channels using a total transmit power, and the base station 10 correspondingly controls that total power via its generation of the first and/or second power control commands. In at least one embodiment, the base station 10 is configured to generate the first power control commands by generating first up and down commands, as needed, to raise or lower the transmit power used by the mobile terminal 10 for transmission of the first uplink channel, so as to maintain the received signal quality of the first uplink channel at or about the received signal quality target. Further, the base station 10 generates the second power control commands by generating second up and down commands, as needed, to raise or lower the total transmit power used by the mobile terminal 10 for transmitting the set of uplink channels, so as to maintain the total received power for the set of uplink channels at or about the total received power target.

In the same or other embodiments, the base station 10 is configured to selectively grant the second uplink channel to the mobile terminal 12, and to selectively operate in a first mode if the second uplink channel has not been granted, and in a second mode if the second uplink channel has been granted. In the first mode, the base station 10 generates the first but not the second power control commands, and in the second mode generates the first and second power control commands. For example, if the mobile terminal 12 is transmitting a control channel on the uplink, but not transmitting an associated traffic channel, the base station 10 may simplify its power control by simply generating a stream of power control commands, as needed, to maintain the SINR of the control channel. Upon granting a traffic channel to the mobile terminal 12, the base station 10 begins generating an additional stream of power control commands, to control the total received power of the control and traffic channels.

In at least one such embodiment, the base station 10 is configured to grant the second uplink channel in one of two power control modes. For example, if the grant corresponds to a low data rate, the first mode will be used, so that there is only one set of power control commands. If the grant corresponds to a high rate, the second mode will be used. Thus, in one or more such embodiments, the base station 10 is configured to grant the second uplink channel to the mobile terminal selectively, and to operate in a first mode if the second uplink channel has been granted at a low rate and in a second mode if the second uplink channel has been granted at a high rate. In the first mode, the base station 10 generates the first but not the second power control commands, and in the second mode it generates the first and second power control commands.

Instead of using two sets of power control commands, the set of commands corresponding to the total power can be replaced with transmit rate commands. More particularly, where the first uplink channel is a fixed-rate control channel and the second uplink channel is a variable-rate traffic channel, one embodiment of the base station 10 is configured to initiate a decrease in a transmit rate used by the mobile terminal 12 to transmit on the variable-rate traffic channel, responsive to determining that a rate-dependent received signal quality target for the variable-rate traffic channel is not being met. Conversely, base station 10 initiates an increase in the transmit rate used by the mobile terminal 12 to transmit on the variable-rate traffic channel, responsive to determining that a rate-dependent received signal quality target for the variable-rate traffic channel is being met. Note that such commands are effectively total power commands, in that a lower rate requires less power.

In the same or other embodiments, the base station 10 is configured to transmit the first and second power control commands to the mobile terminal 12 by transmitting a binary Transmit Power Control (TPC) word in each of a series of repeating transmission slots. For example, a first subset of bits in the TPC word comprises the first power control commands and a second subset of bits comprises the second power control commands. FIG. 10 illustrates an example TPC word, with first and second subsets of TPC bits, representing first and second power control commands for the mobile terminal 12.

An example of modal processing of received power control command words at the mobile terminal 12 is shown in FIG. 11. As illustrated, the mobile terminal 12 receives TPC commands (Block 110) and processes them differently, in dependence on which one of first and second modes it is operating in. If operating in the first mode (Yes from Block 112), the processing circuits 32 control a transmit power used by the mobile terminal 12 for transmitting the first uplink channel according to received power control commands (Block 114). Thus, in the first mode, TPCs received in a power control command word are received and interpreted as commands for the first uplink channel.

However, if operating in the second mode (No from Block 112), the processing circuits 32 parse each received power control command (word) into first and second commands (as shown in FIG. 10) (Block 116), and control the transmit powers used by the mobile terminal 12 for the first and second uplink channels according to the first and second commands (Blocks 118 and 119). Further, as noted with respect to making data rate adjustments in response to changing power allocations, in one or more embodiments, the mobile terminal 12 is configured to autonomously reduce a transmit rate used for transmissions on the second uplink channel, responsive to a commanded reduction in the transmit power used for transmitting the second uplink channel.

In one or more embodiments, the base station 10 comprises a CDMA base station, the first uplink channel comprises a CDMA physical control channel, and the second uplink channel comprises a CDMA physical data channel that is selectively granted. In this context, the mobile terminal 12 operates in the first mode when it has not been granted the data channel and operates in the second mode when it has been granted the data channel. In another embodiment, the mobile terminal 12 also operates in the first mode when it has been granted the data channel but the grant data rate is low; and operates in the second mode when it has been granted a high-rate data channel.

Correspondingly, in such embodiments, the base station 10 is configured to estimate the received signal quality for the CDMA physical control channel based on determining a received SINR for the CDMA physical control channel, and estimate the total received power for the CDMA physical control and data channels. (The estimate can be absolute (S) or relative (SNR).) For example, it may estimate a rise-over-thermal noise power at the base station 10 that is attributable to the CDMA physical control and data channels.

In a Wideband CDMA embodiment of the base station 10, it is configured for operation as a NodeB in a Wideband CDMA network. Here, the first uplink channel comprises an uplink Dedicated Physical Control Channel (DPCCH), and the second uplink channel comprises an uplink Enhanced Dedicated Physical Data Channel (E-DPDCH). Accordingly, the base station 10 is configured to generate the first and second power control commands to maintain the received signal quality for the DPCCH at the received signal quality target and the total received power for the DPCCH and E-DPDCH at the total received power target.

Regardless of the particular air interface/network standards adopted by the base station 10 and the mobile terminal 12, it will be understood that the mobile terminal 12 is configured to support the proposed uplink power control. In one or more embodiments, the mobile terminal's transceiver circuits 30 (as shown in FIG. 1) are configured for sending uplink signals to the base station 10 and receiving downlink signals from the base station 10. Further, its one or more processing circuits 32 are operatively associated with the transceiver circuits 30 and configured to receive power control command words from the base station 10 as a controlling base station, and, in one or more embodiments, to selectively operate in first and second modes.

More broadly, the proposed uplink power control uses two power control loops: one to control the transmit power used for a first channel (or channels), to maintain received signal quality, and one to control the total transmit power for a set of channels, including that first channel (or channels), to maintain the total received power for that set of channels at or about some total received power target. This can be understood as the base station 10 generating uplink transmit power control commands for a given mobile terminal 12, to maintain the total received power S for two or more uplink signals transmitted by that mobile terminal 12, and to maintain the received SINR for one (or a particular subset) of those channels.

The above control can be achieved by controlling a number of paired quantities. Using DPCCH and E-DPDCH as example uplink channels, the base station 10 can control the total received power used for the DPCCH and E-DPDCH and the fraction of power allocated to DPCCH, or to the E-DPDCH. Alternatively, the base station can control the power allocated to DPCCH and to the E-DPDCH, with those controls coordinated in such a way that the total received power is maintained. Other control arrangements are also contemplated.

Using an example where the base station 10 controls the total transmit power used for the DPCCH and the E-DPDCH, and the amount of that total allocated to the DPCCH, those skilled in the art will appreciate that there still are various ways of implementing these two control loops. One option is to use the existing WCDMA transmit power control (TPC) bits in a different way. According to the WCDMA standards, two or four TPC bits are sent per transmit slot to control total transmit power. The contemplated base station 10 can be configured to use half of those bits for controlling DPCCH power (for the purpose of preserving DPCCH SINR at the base station 10). The power levels of other fixed-rate control channels (e.g., High Speed Dedicated Physical Control Channel (HS-DPCCH), Enhanced Dedicated Physical Control Channel (E-DPCCH)) can be adjusted in the same way. The other half of the TPC bits are used to control total power, thus maintaining the desired overall SNR at the base station 10. Other partitions are possible.

In another contemplated control option, the base station 10 "steals" Transport Format Combination Indicator (TFCI) bits when E-TFCI is used, as needed for high data rates. Also, as noted, only one power control loop is needed for the mobile terminal 12, when it has not been granted a (high-rate) traffic channel, such as the E-DPDCH. Thus, the base station 10 can be configured to run one power control loop that generates TPC commands for maintaining the received SINR of the mobile's DPCCH transmissions, and to switch to two power control loops upon granting an E-DPDCH to the mobile terminal 12.

Rate Selection/Adaptation

Assuming the proposed power allocation approach is applied in maintaining a total received power for a control channel and a traffic channel, while maintaining SINR for the control channel, it will be appreciated that the SINR for the traffic data will vary with changing propagation channel conditions. As such, the teachings herein further propose corresponding new approaches to rate selection and adaptation. These teachings extend to initial data rate settings, as well as adapting the rate as SINR changes.

Rate Selection at Time of Grant

In existing WCDMA systems, the Node B and the mobile terminal or other user equipment (UE) agree on an E-TFC table at set-up. This table gives a one-to-one relationship between granted E-DPDCH power and radio bearers—i.e., the table defines a direct relationship between granted E-DPDCH power, which is relative to current DPCCH power and the data rate used for E-DPDCH transmission. An absolute grant is given in terms of E-DPDCH power (relative to current DPCCH), and the table is used to determine the bearer (rate). A relative grant is relative to a preceding grant, and thus can be translated into an absolute grant level.

Figure 13:
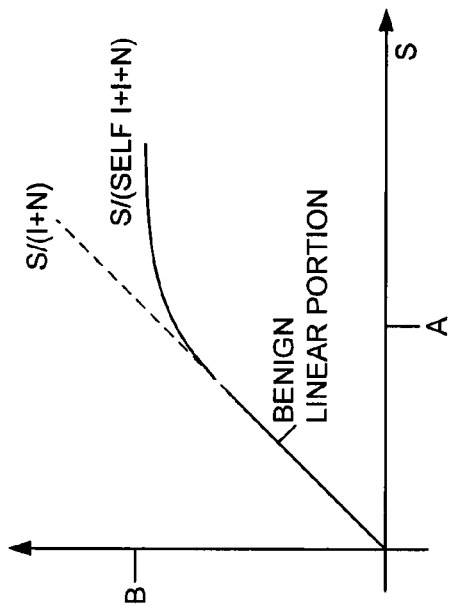
FIG. 13 is a plot illustrating the effects of self-interference at high transmit power levels of a mobile terminal that is transmitting uplink control and traffic channels.
Figure 12:
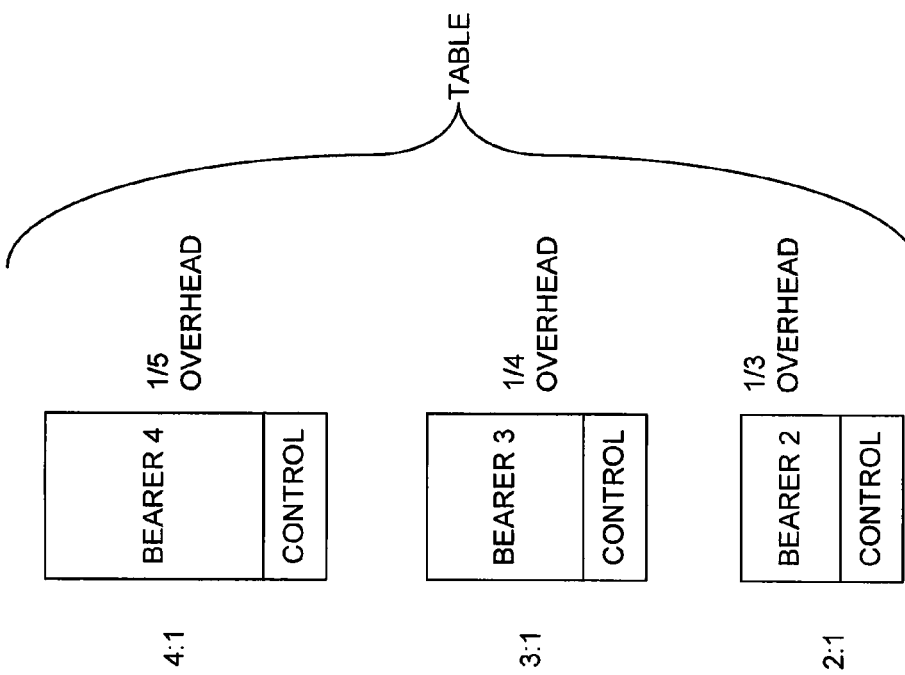
FIG. 12 is a diagram of a known radio bearer table and corresponding initial uplink control and traffic channel power allocations.

FIG. 12 illustrates an E-DPDCH relative power table, also known as an E-TFC table, used in a known approach to transmit power allocation for the E-DPDCH. Table entries for three (radio) bearers are shown. The corresponding procedure is for a base station to signal a grant of 4:1, implying that a total of 5 times the current DPCCH power can be used. The UE would then use the table to determine that bearer 4 can be used. As a general proposition, the E-DPDCH received signal quality at the base station can be maintained if the total transmit power allocation for the DPCCH and the E-DPDCH results in a total received power S at the base station that is less than "A" in the plot shown in FIG. 13. Otherwise, inter-symbol interference (ISI, self-interference) becomes significant and the traffic and DPCCH SINRs are not what would be expected.

According to one embodiment of the proposed uplink power control, the same E-DPDCH granting table as shown in FIG. 12 can be used in the mobile terminal 12. Also, as is conventional, a grant may be made in terms of in terms of E-DPDCH power relative to DPCCH power. Normally, such a grant would point to a nominal bearer (rate). However, according to one aspect of the teachings presented herein, the base station 10 additionally sends an absolute or relative position within the table (corresponding to a certain overhead percentage and bearer). Sending that information gives a rate independent of power.

Figure 14:
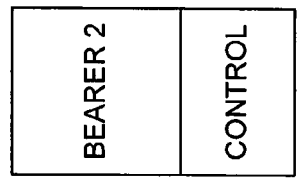
FIG. 14 is a diagram of proposed initial channel power allocations, for a control and traffic channel pair.

For example, a grant of 4:1 would imply that 5 times the current DPCCH power can be used. However, suppose there is significant ISI, which would cause traffic and DPCCH SINR to suffer. To remedy this, the base station 10 would signal the use of bearer 2. Notably, this additional signaling changes both the rate and the fraction of power allocated to DPCCH. Thus, as shown in FIG. 14, bearer 2 would be used at a power level five times the original DPCCH level. Notice, too, that the new DPCCH level is different due to the independent signaling of the bearer. This combined signaling serves the goal of maintaining an overall SNR for the channel pair (DPCCH and E-DPDCH), while maintaining SINR for the DPCCH.

One aspect of the above-proposed approach to granting relates to a base station determining what rate to allocate. Conventionally, off-line simulations were used to determine the table that gives the one-to-one relation between power granted and rate. That approach assumes SINR scales with S (i.e., that self interference is negligible). However, according to one or more embodiments proposed herein, the base station 10 predicts SINR, accounting for the self interference that will result when the grant is used. For example, one or more embodiments of the base station 10 employ a linear equalizer, such as a G-Rake receiver. Example details for G-Rake receiver operation appear in the published patent application WO 2005/096517 to Cairns, et al., which is commonly owned with this application.

One type of G-Rake receiver uses a parametric model of received signal impairment correlations. In particular, the impairment correlation matrix R of a received CDMA signal can be expressed as a function of certain parameters based on the theoretical expression given as, $$R = \frac{C}{N} \frac{E_t}{E_p} R_{SI} + N_o R_n, \quad \text{(Eq. 2)}$$

where $E_p$ is the pilot energy per unit time, $E_t$ is the total transmitter energy per unit time, N is the spreading factor, C is a scaling factor, $N_o$ is the noise factor, $R_{SI}$ is an interference correlation matrix (including self-interference), and $R_n$ is a thermal noise correlation matrix arising from the autocorrelation properties of receiver filtering. Note that $R_{SI}$ may be constructed as an interference covariance (or correlation) matrix, and $R_n$ may be constructed as a noise correlation matrix.

In looking at (Eq. 2) above, it should be noted that a receiver generally cannot explicitly know $E_t/E_p$, nor $N_o$. This issue can be addressed by determining the parametric model impairment terms $R_{SI}$ and $R_n$, channel coefficient and receiver pulse shape information. Those skilled in the art will appreciate that a given receiver can be configured with knowledge of its receiver filter pulse shape, e.g., its filter autocorrelation function, and can maintain channel coefficient estimates based on receiving pilot symbols, training data, or other signals known a priori to the receiver such that reception of the known signal can be used to characterize the propagation channels. Exemplary formulas are given herein for computing $R_{SI}$ and $R_n$ in terms of channel coefficient and pulse shape information.

For example, the teachings herein may use an impairment correlation model that, in an exemplary embodiment, comprises an interference term that is scaled by a first model fitting parameter, and a noise term that is scaled by a second model fitting parameter. Using this method, the impairment correlations R can be modeled as, $$R = \alpha R_{SI} + \beta R_n, \quad \text{(Eq. 3)}$$

where $$R_{SI}(d_1, d_2) = \sum_{l=0}^{L-1} \sum_{q=0}^{L-1} g_l g_q^* \sum_{\substack{m=-\infty \\ m\neq 0}}^{m=\infty} R_p(d_1 - mT_c - \tau_l) R_p^*(d_2 - mT_c - \tau_q), \quad \text{(Eq. 4)}$$

and $$R_n(d_1, d_2) = R_p(d_1 - d_2). \quad \text{(Eq. 5)}$$

In the above equations, $$g(\tau) = \sum_{l=0}^{L-1} g_l \delta(\tau - \tau_l),$$

which is a complex channel model, $R_p$ is a pulse shape autocorrelation function, $T_c$ is a CDMA chip period, and $d_k$ is a delay of the k-th G-Rake finger. Note, too, that the g values are channel coefficients corresponding to the pilot channel, i.e., channel coefficients estimated directly from a received pilot channel.

Using signal processing based on the above equations, the base station 10 can predict the SINR by estimating the signal power (alpha) and noise power (beta). Here, the base station 10 can be configured to scale alpha up to account for the increase in power when using the grant and it would determine the SINR for both the DPCCH and E-DPDCH. The data rate (to be set) for the E-DPDCH would be lowered until both DPCCH and E-DPDCH quality requirements were met.

Still other embodiments of the base station 10 do not use the above rate initialization. For example, one embodiment of the base station 10 does not perform the extra bearer selection signaling as described above. Skipping that signaling may result in the mobile terminal 12 starting at a too-high rate, but this initial transient condition is mitigated if there is a delay between granting a rate and the rate being used. In such embodiments, the base station 10 can use the delay to send additional up power commands to the mobile terminal 12 to adjust DPCCH power prior to the mobile terminal 12 using the grant.

Thus, with reference to the table in FIG. 12, the base station 10 may, instead of giving a grant of 4:1 (5×), give a grant of 2:1 (3×) (to get the correct bearer) and give enough up power commands so that when the grant is used by the mobile terminal 12, it is 5× relative to the original DPCCH level (before the up commands were given).

Rate Adaption

Once a rate has been selected and transmission begun, the base station 10 maintains the resource allocation S, using SNR-based power control. However, as the propagation channel becomes instantaneously more or less dispersive, due to fading on the different paths, the SINR of both the traffic and control channels will fluctuate. (Here, and throughout this document, those skilled in the art will recognize that, unless otherwise stated or made clear from its context, the term "channel" denotes defined, formatted signal within a composite signal having multiple channelized signals. Thus, the SINR and/or SNR of a given channel will be understood as relating to the received signal for that channel.)

For the control channels, the base station 10 uses SINR-based power control to maintain a desired received signal quality, as described earlier. This control impacts the SINR of the traffic channel, which is also affected by the propagation channel variations. Thus, rate adaptation is used for the traffic channel in one or more control embodiments, to compensate for changing SINR of the traffic channel, as received at the base station 10.

In general, the rate (block size, bearer) can be determined at the base station 10, which sends corresponding commands to the mobile terminal 12. Alternatively, the mobile terminal 12 can be configured to perform rate adaptation, thereby avoiding the extra signaling between the base station 10 and the mobile terminal 12.

In one approach to rate adaptation as performed by the mobile terminal 12, one may assume that the base station's power control is working properly. On that assumption, the mobile station 12 can be configured to infer the E-DPDCH/DPCCH ratio from the base station's SNR and SINR control loops. The mobile terminal 12 then uses that ratio to determine the corresponding rate from its memory-stored E-TFC table, and uses that rate. For example, if the mobile terminal's DPCCH transmit power is commanded up and the overall transmit power S is commanded down, the mobile terminal 12 computes a lower E-DPDCH/DPCCH ratio and correspondingly adopts a lower data rate for the E-DPDCH. Such operations assume that the table is designed properly and everything is working well, so that a desired block error rate (e.g. 10%) is achieved for the E-DPDCH at the base station 10.

In another embodiment, which offers more robust operation, the mobile terminal 12 is configured to monitor the occurrence of block errors at the base station 10 by, for example, monitoring the ACK/NACK process. If the mobile terminal 12 observes fewer errors than expected, it can be more aggressive in terms of selecting its E-DPDCH data rate and vice versa. Note that in some sense this replaces a conventional outer loop power control that adjusts an SINR target for a received signal, to maintain a desired BER/BLER (bit error rate/block error rate). This can be used in conjunction with the previous embodiment.

In considering how the mobile terminal 12 can use more aggressive or conservative rates given the same E-DPDCH/DPCCH power, it is noted that the conventional E-TFC table gives a one-to-one relationship between the E-DPDCH/DPCCH power ratio and rate. Thus, in one embodiment, the mobile terminal 12 instead uses multiple E-TFC tables, having more aggressive/less aggressive ratio-to-rate mappings. For example, it can use three tables: one having an aggressive mapping, one having a moderate mapping, and one having a conservative mapping. These tables, or related data, can be signaled from the base station 10 to the mobile terminal 12.

However, it may be desirable to avoid such signaling, and simply reuse the conventional E-TFC table in some way. In one embodiment, the mobile terminal 12 "ignores" the beta factor when adapting the rate. These beta factors normally determine the E-DPDCH/DPCCH power ratio. Thus, by ignoring the beta factor, the mobile terminal 12 effectively is allowing the base station's two control loops to determine that ratio instead. To be more aggressive, the mobile terminal 12 uses a higher rate from the E-TFC table, but takes the beta settings from the two control loops. For example, the two power control loops determine the E-DPDCH/DPCCH power ratio to be $\gamma_i$. According to conventional use of the E-TFC table, the mobile terminal 12 would use the corresponding rate $r_i$ (a given transport block size). However, in one or more embodiments taught herein, the mobile terminal 12 is configured to apply a rate adjustment factor $\Delta$ for rate selection. As such, the mobile terminal 12 does not use the rate $r_i$ which would have been conventionally determined, but instead uses rate $r_{i+\Delta}$. A positive $\Delta$ biases the rate up (aggressive), whereas a negative $\Delta$ biases the rate down (conservative).

This is an implicit change to the existing WCDMA standards and may impact base station parameter estimation algorithms should they rely on fixed power relations between DPCCH and the E-DPDCH codes. However, it is believed that the impact should be minimal, as the base station 10 can be advantageously configured to infer the next relations, assuming the mobile terminal 12 received the control commands successfully and followed them.

Figure 15:
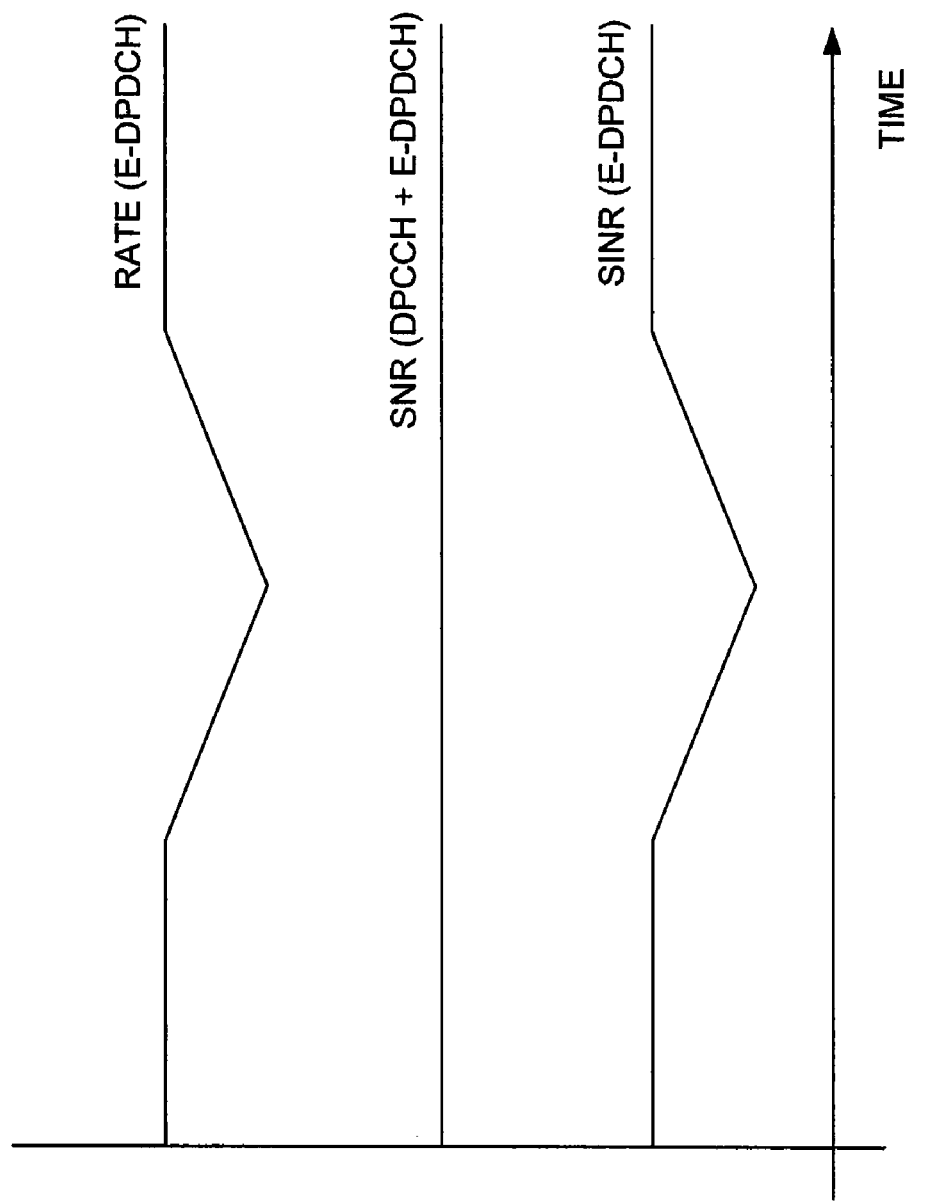
FIG. 15 is a plot of rate adaptation according to changing signal-to-interference plus noise.

As for determining what the new rate should be, one or more embodiments contemplated herein use an intelligent "walk" algorithm to adapt the rate upward when there are no erasures and downward when there are erasures. Further, a "hold" option is used to avoid bouncing between too high a rate and a good rate. This procedure is an implicit change to the WCDMA standards, in that the mobile terminal 12 no longer relies on the base station 10 (NodeB) to fix the erasure problem via power control. The overall concept is illustrated in FIG. 15. One sees that the base station's uplink power control is used to maintain the SNR of the DPCCH and E-DPDCH pair, while the data rate on the E-DPDCH is adapted to the changing SINR of the E-DPDCH. Use of the base station's two control loop commands can also be incorporated into this scheme. For example, the above-described approach involving the scaling of alpha can be used for determining an initial change in rate, which can be scaled down by, for example, 0.9, before being applied.

Alternatively, as noted, the base station 10 can control rate adaptation, as it generally has access to the same information as the mobile terminal 12, and could use the same or a different approach to determining new rates. However, if the base station 10 makes the rate determinations, such determinations need to be signaled to the mobile terminal 12. Approaches already described herein for the additional power control loop—i.e., the second power control commands—could also be used to send additional information to the mobile terminal 12, as to whether to drop down, maintain, or go up in rate (bearer and overhead partition).

Further, in some cases, the mobile terminal 12 may not use the full grant given for its E-DPDCH. For example, the mobile terminal 12 may not use its full grant because it does not have enough bits to send, or because it does not have enough transmit power. Because the mobile terminal 12 can send Scheduling Information (SI) to the base station 10, and because that information indicates the mobile terminal's transmit buffer status and its transmit power headroom, the base station 10 has knowledge of whether the mobile terminal 12 can make full use of a contemplated grant. Consequently, the base station 10 can formulate the grant in view of the mobile terminal's buffer/power status, as reported to it via the mobile terminal's SI report(s), to make sure that the grant is appropriate for that status.

If, however, the information needed to make rate decisions is not available to the base station 10, then the mobile terminal 12 needs to determine a suitable power level and rate to use. Note that if there is not enough transmit power, then the mobile terminal 12 is likely to be at the edge of the service area (cell) supported by the base station 10, which corresponds to the benign linear portion of the curve in FIG. 13.

General Implementation

As a general proposition, the uplink power control proposed herein uses two closed-loop control loops: one loop controls the power of a total signal or first portion of that signal (e.g. the DPCCH); the second loop controls the power of a first portion of a total signal, a second portion (e.g. traffic) of that total signal, or the fraction of power allocated to either. In at least one embodiment, both loops are used to maintain the received SINR of fixed-rate (control, overhead) signals and to maintain total received power (S or SNR) of the total signal.

As a further aspect, one or more embodiments of the proposed uplink power control modify the rate grant procedure by having the base station 10 signal both total relative power (relative to current reference channel power) and rate bearer (absolute or relative to reference bearer corresponding to power). Correspondingly, the base station 10 and/or the mobile station 12 perform rate adaptation, wherein the bearer is adapted based on block errors and the base station's power control loops.

Figure 16:
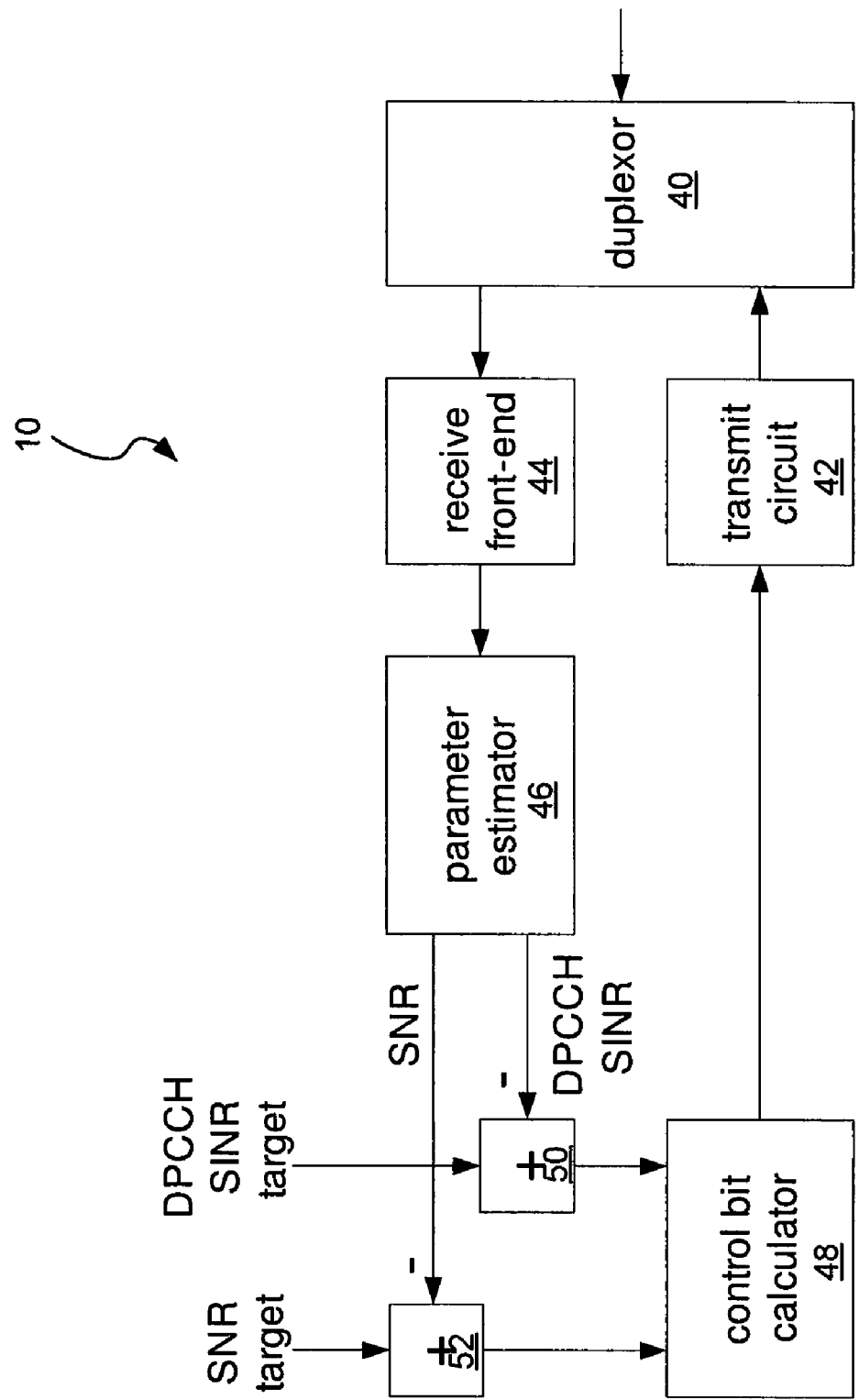
FIG. 16 is a block diagram of one embodiment of base station processing circuits, configured to implement uplink power control.

With the above in mind, FIG. 16 presents a more detailed block diagram for one embodiment of the base station 10. Here, the duplexor 40, transmit circuit 42, and receiver front-end 44, will be understood as comprising all or part of the transceiver circuits 14 introduced in FIG. 1. These circuits are configured for transmitting and receiving wireless signals using one or more antennas.

In particular, the duplexor 40 passes received uplink signals to the receiver front end 44, for filtering and mixing down to baseband. For purposes of this example, a total uplink signal from a given mobile terminal 12 includes the DPCCH as a first uplink channel, and the E-DPDCH as a second uplink channel.

In turn, the baseband signal is provided to a parameter estimator 46, which may include the signal power estimator 22 and signal quality estimator 24 shown in FIG. 1. The parameter estimator 46 estimates overall SNR for the set of uplink channels received from the mobile terminal 12. In this example, the set includes the DPDCH as a first uplink channel and the E-DPDCH as a second uplink channel. Thus, for this example, the parameter estimator 46 estimates SNR for the combination of E-DPDCH and DPCCH, as received at the base station 10, and estimates SINR for the DPCCH. These parameter estimates are compared to target values to determine the control commands needed.

Specifically, the illustrated control bit calculator 48 receives comparison results from comparator/differencing circuits 50 and 52, representing the difference between the estimated SNR and the target SNR, and the estimated SINR and the target SINR. The control bit calculator 48, which may comprise all or part of the uplink power controller 20 shown in FIG. 1, generates first and second power control commands for the two power control loops, based on these comparisons. The generated power control commands are provided to the transmitter 42, for transmission to the mobile station 12.

FIG. 17 correspondingly provides a more detailed diagram for one embodiment of the mobile terminal 12. A duplexer 60 passes the received signal to a receiver front end 62, for filtering and mixing down to baseband. The baseband signal is provided to a mode controller/command demodulator 64, which demodulates the first and second power control commands, which are included in the signal received by the mobile terminal 12. These commands are sent to a transmit circuit 66 to control the uplink transmit power of the DPCCH and E-DPDCH by the mobile terminal 12. Note that a memory 68 or other storage device holds the E-TFC table or other power ratio/bearer table information, for use as described earlier herein.

Also note that the mobile terminal 12 can operate modally (e.g., in the above-described first or second modes), according to the mode controller/command demodulator 64. For example, the mode controller/command demodulator 64 can be configured to process the received power control command words differently (as commands for one loop, or parsed into commands for first and second loops), based on the mode of operation. The mode changes, for example, as a function of whether a traffic channel has or has not been granted to the mobile terminal 12.

Further, for power and rate allocation at the time of grant, the rate could be indicated as position in the stored E-TFC table or as a position relative to the traditional position in the table. The latter would require fewer bits to signal, and the base station 10 could implement this approach by signaling a relative position that is lower in rate, saving a sign bit as well. The base station 10 also can be configured to command the mobile terminal 12 to adapt its E-DPDCH rate, based on estimates of SINR for the E-DPDCH channel.

FIG. 18 illustrates an approach for determining a change in uplink rate at either the base station 10 or the mobile terminal 12 using only block error indicators. When a Transmission Time Interval (TTI) has been demodulated, a block error indicator (BEI) is set to 0 or 1 depending on whether the TTI was decoded successfully or not. This BEI is added to a list of the latest N block indicators using, for example, a FIFO buffer (Block 120). As an example, N equals ten (10). The number of block errors is counted (Block 122). If the count is 0 (Block 124), then the rate is increased (Block 126). If the count is 1 (Block 128), then the rate is maintained (Block 130). If the count is greater than 1, then the rate is lowered (Block 132). Raising and lowering the rate can be achieved by moving up and down in a table of transmission formats corresponding to different rates.

Figure 19:
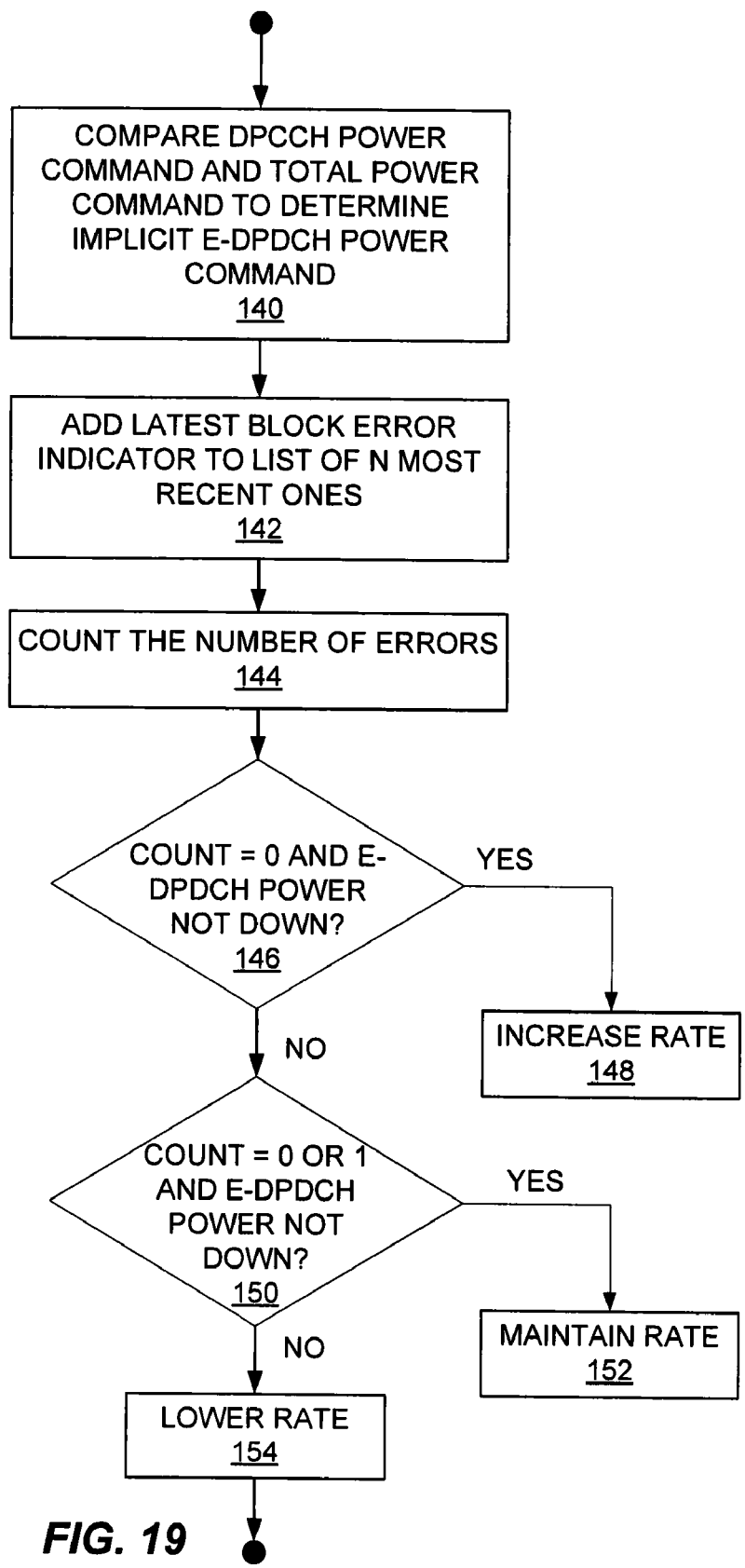

FIG. 19 illustrates in Blocks 140-154 (even) an approach for determining change in rate that uses both block error indicates and control loop commands. In this example method, it is assumed that the two uplink power control loops run by the base station 10 are DPCCH power (for SINR) and total power (for S). These two loops and their relationship are used to determine an implied E-DPDCH power. Alternatively, if the two control loops are DPCCH power and E-DPDCH power, then the E-DPDCH power command can be used directly.

In general, there are many approaches for determining how to adjust the rate, similar to the many approaches for adjusting a target SINR value in traditional outer-loop power control. Those skilled in the art will appreciate that FIGS. 18 and 19 stand as advantageous but non-limiting examples. Further, as was noted earlier, the mobile terminal 12 may not have enough bits to send to use the full rate, and, in such cases, in this case, the rate may be lower and possibly the overall transmit power lowered.

As shown in the above examples, the present invention's advantageous uplink power control provides a number of advantages. For example, it avoids instability and power rushes by directly controlling the received signal power (at the base station 10) from mobile terminals 12 operating at high data rates. As another example, it provides tighter control of resources, avoiding the need for under-loading the base station 10 (or network at large), to allow for varying power needs for maintaining SINR. As a further example, it improves latency by reducing the need for data packet retransmissions through better rate selection.

Thus, among other things, the present invention provides a method of improving the reliability of communications between user terminals and a base station. In at least one embodiment, the disclosed approach does so by transmitting a power control command from the base station to the user terminal to control one of a total transmit power or a transmit power for a first portion of an overall (total) signal transmitted by the terminal. As noted, the composite signal includes, in at least one embodiment, a DPCCH and an E-DPDCH.

Further, the method includes transmitting a second control command from the base station to the user terminal, to control one of a transmit power for a second portion of the transmitted signal, the fraction of power allocated to a first portion of the transmitted signal, or the fraction of power allocated to a second portion of the transmitted signal. With this approach, the two commands are set to maintain the total received power from the user terminal and maintain the quality of the first portion of the transmitted signal.

In one or more embodiments, the disclosed uplink control is used to maintain the received signal quality of a control (or other fixed-rate) channel received from the terminal, while maintaining a total power for the control channel in combination with a traffic (or other variable-rate) channel. In this context, the method may further include setting the traffic channel rate at the time of granting the traffic channel, such as by signaling relative or absolute bearer in a table, in addition to signaling power and during data transmission, such as by using a rate walk algorithm at either UE or base station.

However, those skilled in the art will appreciate that the above examples do not limit the present invention. Indeed, the present invention is not limited by the foregoing discussion, or by the accompanying drawings, and, instead, is limited only by the following appended claims and their legal equivalents.

What is claimed is:

1. A method in a wireless communication network base station of uplink power control, the method comprising:
    generating first power control commands for a mobile terminal, calculated to maintain a received signal quality of a first uplink channel transmitted by the mobile terminal at or about a received signal quality target;
    generating second power control commands for the mobile terminal, calculated to maintain a total received power of a set of uplink channels transmitted by the mobile terminal at or about a total received power target, said set including at least the first uplink channel and a second uplink channel transmitted by the mobile terminal; and transmitting the first power control commands and the second power control commands to the mobile terminal.

2. The method of claim 1, wherein the first uplink channel is a control channel and the second uplink channel is a traffic channel, which is selectively granted to the mobile terminal by the base station, and further comprising, as part of granting the traffic channel to the mobile terminal, indicating to the mobile terminal an initial allocation of transmit power for the traffic channel relative to transmit power of the control channel.

3. The method of claim 1, wherein the mobile terminal maintains a table or formula relating different ratios of traffic-to-control channel transmit power to different radio bearers supporting different transmit rates, and wherein the base station indicates a particular radio bearer to be used by the mobile terminal by signaling a table index or a formula parameter.

4. The method of claim 1, wherein the base station determines a particular radio bearer to be used by the mobile terminal by predicting a received signal quality at the base station for the traffic channel as a function of power allocation and estimated self-interference associated with the traffic channel.

5. The method of claim 1, wherein the mobile terminal transmits the set of uplink channels using a total transmit power, and wherein generating the first power control commands comprises generating first up and down commands, as needed, to raise or lower the transmit power used by the mobile terminal for transmitting the first uplink channel, so as to maintain the received signal quality of the first uplink channel at or about the received signal quality target.

6. The method of claim 5, wherein generating the second power control commands comprises generating second up and down commands, as needed, to raise or lower the total transmit power used by the mobile terminal for transmitting the set of uplink channels, or to raise or lower the transmit power used by the mobile terminal for transmitting at least the second uplink channel in the set of uplink channels, so as to maintain the total received power for the set of uplink channels at or about the total received power target.

7. The method of claim 1, wherein the second uplink channel is selectively granted to the mobile terminal, and further comprising selectively operating the base station in a first mode if the second uplink channel has not been granted and in a second mode if the second uplink channel has been granted, wherein in the first mode the base station generates the first but not the second power control commands, and in the second mode generates the first power control command and the second power control commands.

8. The method of claim 1, wherein the second uplink channel is selectively granted to the mobile terminal, and further comprising selectively operating the base station in a first mode if the second uplink channel has been granted at a low rate and in a second mode if the second uplink channel has been granted at a high rate, wherein in the first mode the base station generates the first but not the second power control commands, and in the second mode generates the first power control commands and the second power control commands.

9. The method of claim 1, wherein the first uplink channel is a fixed-rate control channel and the second uplink channel is a variable-rate traffic channel, and further comprising initiating a decrease in a transmit rate used by the mobile terminal to transmit on the variable-rate traffic channel, responsive to determining that a rate-dependent received signal quality target for the variable-rate traffic channel is not being met.

10. The method of claim 9, further comprising initiating an increase in the transmit rate used by the mobile terminal to transmit on the variable-rate traffic channel, responsive to determining that a rate-dependent received signal quality target for the variable-rate traffic channel is being met.

11. The method of claim 1, wherein transmitting the first power control commands and the second power control commands to the mobile terminal comprises transmitting a binary Transmit Power Control word in each of a series of repeating transmission slots, wherein a first subset of bits comprises the first power control commands, and a second subset of bits comprises the second power control commands.

12. The method of claim 1, wherein the first uplink channel comprises a CDMA physical control channel, and the second uplink channel comprises a CDMA physical data channel, and further comprising estimating the received signal quality for the CDMA physical control channel based on determining a received signal-to-interference-plus-noise ratio for the CDMA physical control channel, and estimating the total received power for the CDMA physical control and data channels.

13. A base station for use in a wireless communication network, said base station configured to provide uplink power control for mobile terminals and comprising:
transceiver circuits to receive uplink signals from mobile terminals and to transmit downlink signals to mobile terminals; and
one or more processing circuits operatively associated with the transceiver circuits and configured to:
generate first power control commands for a mobile terminal, calculated to maintain a received signal quality for a first uplink channel transmitted by the mobile terminal at a received signal quality target; and
generate second power control commands for the mobile terminal, calculated to maintain a total received power for a set of uplink channels transmitted by the mobile terminal at a total received power target, said set including at least the first uplink channel and a second uplink channel transmitted by the mobile terminal; and
transmit the first power control commands and the second power control commands to the mobile terminal.

14. The base station of claim 13, wherein the first uplink channel is a control channel and the second uplink channel is a traffic channel, which is selectively granted to the mobile terminal by the base station, and wherein, as part of granting the traffic channel to the mobile terminal, the base station is configured to indicate to the mobile terminal a particular radio bearer to use for transmitting on the traffic channel and indicate to the mobile terminal an initial allocation of transmit power for the traffic channel relative to transmit power of the control channel.

15. The base station of claim 14, wherein the mobile terminal maintains a table or formula relating different ratios of traffic-to-control channel transmit power to different radio bearers supporting different transmit rates, and wherein the base station is configured to indicate the particular radio bearer to be used by the mobile terminal by signaling a table index or formula parameter.

16. The base station of claim 14, wherein the base station is configured to determine the particular radio bearer by predicting a received signal quality at the base station for the traffic channel as a function of power allocation and estimated self-interference associated with the traffic channel.

17. The base station of claim 13, wherein the mobile terminal transmits the set of uplink channels using a total transmit power, and wherein the base station is configured to generate the first power control commands by generating first up and down commands, as needed, to raise or lower the transmit power used by the mobile terminal for transmission of the first uplink channel, so as to maintain the received signal quality of the first uplink channel at or about the received signal quality target.

18. The base station of claim 17, wherein the base station is configured to generate the second power control commands by generating second up and down commands, as needed, to raise or lower the total transmit power used by the mobile terminal for transmitting the set of uplink channels, so as to maintain the total received power for the set of uplink channels at or about the total received power target.

19. The base station of claim 13, wherein the base station is configured to selectively grant the second uplink channel to the mobile terminal, and to selectively operate in a first mode if the second uplink channel has not been granted, and in a second mode if the second uplink channel has been granted, and wherein in the first mode the base station generates the first but not the second power control commands, and in the second mode generates the first power control commands and the second power control commands.

20. The base station of claim 13, wherein the base station is configured to grant the second uplink channel to the mobile terminal selectively, and to operate in a first mode if the second uplink channel has been granted at a low rate and in a second mode if the second uplink channel has been granted at a high rate, wherein in the first mode the base station generates the first but not the second power control commands, and in the second mode generates the first power control commands and the second power control commands.

21. The base station of claim 13, wherein the first uplink channel is a fixed-rate control channel and the second uplink channel is a variable-rate traffic channel, and wherein the base station is configured to initiate a decrease in a transmit rate used by the mobile terminal to transmit on the variable-rate traffic channel, responsive to determining that a rate-dependent received signal quality target for the variable-rate traffic channel is not being met.

22. The base station of claim 21, wherein the base station is configured to initiate an increase in the transmit rate used by the mobile terminal to transmit on the variable-rate traffic channel, responsive to determining that a rate-dependent received signal quality target for the variable-rate traffic channel is being met.

23. The base station of claim 13, wherein the base station is configured to transmit the first power control commands and the second power control commands to the mobile terminal by transmitting a binary Transmit Power Control word in each of a series of repeating transmission slots, wherein a first subset of bits comprise the first power control commands, and a second subset of bits comprise the second power control commands.

24. The base station of claim 13, wherein the base station comprises a CDMA base station, and wherein the first uplink channel comprises a CDMA physical control channel, and the second uplink channel comprises a CDMA physical data channel, and wherein the base station is configured to estimate the received signal quality for the CDMA physical control channel based on determining a received signal-to-noise-plus-interference ratio for the CDMA physical control channel, and estimate the total received power for the CDMA physical control and data channels.

25. The base station of claim 13, wherein the base station comprises a Wideband CDMA base station configured for operation as a NodeB in a Wideband CDMA network, and wherein the first uplink channel comprises an uplink Dedicated Physical Control Channel (DPCCH), and wherein the second uplink channel comprises an uplink Dedicated Physical Data Channel (DPDCH), and wherein the base station is configured to generate the first power control commands and the second power control commands to maintain the received signal quality for the DPCCH at the received signal quality target and the total received power for the DPCCH and DPDCH at the total received power target.

26. A method of uplink power control in a mobile terminal, the method comprising:
  receiving power control command words from a controlling base station;
  selectively operating in a first mode and a second mode;
  if operating in the first mode, controlling a transmit power used by the mobile terminal for transmitting a first uplink channel according to received power control commands; and
  if operating in the second mode, parsing each received power control command into first commands and second commands, and controlling the transmit power used by the mobile terminal for the first uplink channel and a transmit power used by the mobile terminal for a second uplink channel according to the first commands and the second commands.

27. The method of claim 26, further comprising autonomously reducing a transmit rate used for transmissions on the second uplink channel, responsive to a commanded reduction in the transmit power used for transmitting the second uplink channel.

28. The method of claim 26, further comprising selecting the first mode of operation if the second uplink channel has not been granted to the mobile terminal, and selecting the second mode of operation if the second uplink channel has been granted to the mobile terminal.

29. The method of claim 28, wherein the first uplink channel is an uplink control channel for uplink control signaling and the second uplink channel is an uplink traffic channel for high-rate uplink data transmission.

30. A mobile terminal comprising:
  transceiver circuits for sending uplink signals to a base station and receiving downlink signals from a base station; and
  one or more processing circuits operatively associated with the transceiver circuits and configured to:
    receive power control command words from a controlling base station;
    selectively operate in a first mode and a second mode;
    if operating in the first mode, control a transmit power used by the mobile terminal for transmitting a first uplink channel according to received power control commands; and
    if operating in the second mode, parse each received power control command into first and second commands, and control the transmit power used by the mobile terminal for the first uplink channel and a transmit power used by the mobile terminal for a second uplink channels according to the first commands and the second commands.

31. The mobile terminal of claim 30, wherein the mobile terminal is configured to autonomously reduce a transmit rate used for transmissions on the second uplink channel, responsive to a commanded reduction in the transmit power used for transmitting the second uplink channel.

32. The mobile terminal of claim 30, wherein the mobile terminal is configured to select the first mode of operation if the second uplink channel has not been granted to the mobile terminal, and select the second mode of operation if the second uplink channel has been granted to the mobile terminal.

33. The mobile terminal of claim 32, wherein the first uplink channel is an uplink control channel for uplink control signaling and the second uplink channel is an uplink traffic channel for high-rate uplink data transmission.

34. The mobile terminal of claim 30, wherein the first uplink channel is an uplink control channel for uplink control signaling and the second uplink channel is an uplink traffic channel for high-rate uplink data transmission, and wherein the mobile terminal is configured to use an intelligent walk algorithm to adapt the rate on the uplink traffic channel, in conjunction with responding to the received power control commands, said intelligent walk algorithm configured to adapt the rate upward when there are no erasures on the uplink traffic channel at the base station and downward when there are erasures on the uplink traffic channel at the base station.

* * * * *

UNITED STATES PATENT AND TRADEMARK OFFICE
CERTIFICATE OF CORRECTION

PATENT NO. : 8,401,585 B2
APPLICATION NO. : 12/553333
DATED : March 19, 2013
INVENTOR(S) : Bottomley et al.

Page 1 of 1

It is certified that error appears in the above-identified patent and that said Letters Patent is hereby corrected as shown below:

In the Specifications:

In Column 6, Line 20, delete "αS" and insert -- aS --, therefor.

In Column 6, Line 23, delete "α" and insert -- a --, therefor.

Signed and Sealed this
Eighteenth Day of June, 2013

Teresa Stanek Rea
*Acting Director of the United States Patent and Trademark Office*